United States Patent [19]
Apps

[11] Patent Number: 5,071,026
[45] Date of Patent: Dec. 10, 1991

[54] CASE FOR BOTTLES OF DIFFERENT SIZES

[75] Inventor: William P. Apps, Anaheim, Calif.

[73] Assignee: Rehrig-Pacific Company, Inc., Los Angeles, Calif.

[21] Appl. No.: 531,407

[22] Filed: Jun. 4, 1990

[51] Int. Cl.$^5$ ............................................. B65D 1/36
[52] U.S. Cl. ................................. 220/516; 206/427; 206/511; 220/504; 220/510; 220/528
[58] Field of Search ............... 206/427, 201, 203, 503, 206/509–511; 220/503, 504, 509, 510, 512, 513, 515, 516, 518, 519, 528

[56] References Cited

U.S. PATENT DOCUMENTS

| 538,879 | 5/1895 | Mills et al. ........................... 220/512 |
| 601,245 | 3/1898 | Fehr . |
| 1,693,906 | 12/1928 | Lippincott ........................... 220/512 |
| 2,718,326 | 9/1955 | Le Blanc . |
| 2,970,715 | 2/1961 | Kappel et al. . |
| 2,974,788 | 3/1961 | Robbins . |
| 3,101,652 | 8/1963 | Imielinski . |
| 3,327,885 | 6/1967 | Carle et al. . |
| 3,353,704 | 11/1967 | Belcher et al. . |
| 3,416,694 | 12/1968 | Bebb ................................... 220/518 |
| 3,428,207 | 2/1969 | Schoeller ............................ 220/516 |
| 3,517,852 | 6/1970 | Schoeller ............................ 220/518 |
| 3,628,684 | 12/1971 | Sere .................................... 220/516 |
| 3,752,385 | 8/1973 | Woodgate . |
| 3,817,372 | 6/1974 | Smith .............................. 220/504 X |
| 4,029,209 | 6/1977 | Frahm et al. ........................ 206/510 |
| 4,410,099 | 10/1983 | de Laroslere ....................... 220/516 |
| 4,499,997 | 2/1985 | Swingley, Jr. . |
| 4,635,810 | 1/1987 | Tate . |
| 4,844,279 | 7/1989 | Chalat ................................ 220/504 |
| 4,899,874 | 2/1990 | Apps et al. . |

FOREIGN PATENT DOCUMENTS

| 636543 | 9/1963 | Belgium . |
| 1255160 | 1/1961 | France . |
| 1423963 | 11/1965 | France . |
| 2158044 | 11/1985 | United Kingdom ............... 206/427 |

Primary Examiner—Bryon P. Gehman
Attorney, Agent, or Firm—Banner, Birch, McKie & Beckett

[57] ABSTRACT

A reusable case for storing, transporting and merchandising bottles of alternatively first and second different sizes. The case has opposing open first and second ends and a shelf secured therein and midway between the ends. First and second different divider structures are formed on opposite respective sides of the shelf. The first divider structure, with the first end oriented up, defines within the case and on the shelf a first plurality of pockets for retaining bottles of the first size. Alternatively and with the case flipped over, a second plurality of pockets for the second size bottles is formed on the other side of the shelf by the second divider structure. Bottles positioned in either of the pockets extend above the top of the case in a merchandising position. When a similar case is stacked on top of the loaded case, the bottles extend up into the lower empty portion of the top case. The divider structures are configured so that the one facing down can receive up thereinto the tops of bottles in a case stacked therebeneath and in the pocket pattern of the different upwardly-facing divider structure.

7 Claims, 13 Drawing Sheets

CASE FOR BOTTLES OF DIFFERENT SIZES

BACKGROUND OF THE INVENTION

The present invention relates to cases for storing, transporting and merchandising containers and more particularly one liter through two liter, glass and PET bottles.

It has been the practice in the packaging industry in the past to individually design a case or box for a particular use and the divider to be used in that box. Such cases or boxes are thus designed to hold one container or product and do not ordinarily lend themselves to the effective packaging of several different size containers. This results in a variety of cases or boxes being produced of differing sizes and dimensions. While the prior art systems have the advantage of being designed specifically for a particular container size and thus avoiding the problem of a make-shift case or box, they are expensive since they require separate designs for each use or container. Also, if various types of containers are to be shipped in the same storage chamber of a transport vehicle, the cases or boxes may not be of uniform exterior dimensions and may not stack compactly. The lack of uniformity can waste space in the storage chamber of the transport vehicle.

Additionally, manufacturers may desire to switch from shipping their material from one size container to another based on a number of factors such as consumer preference, shipping cost, convenience or regulation. Thus, it is necessary to provide flexibility in the packaging system used for storing and transporting the containers in which the goods are stored.

Particularly, in the soft drink industry a bottler may learn that consumers desire containers of one particular size over another or that shipping costs are increasing rapidly thus necessitating a switch to lighter weight plastic bottles despite consumer demand for glass bottles. Such changeovers must occur rapidly since consumer preferences and shipping costs can change rapidly.

Furthermore, the cost of the packaging system may be great for the individual bottler and therefore he may not desire to switch to another packaging system even though consumer demands or regulations have changed. Thus, the bottler is in a difficult situation and may have to discard sturdy, reusable shipping cases that are in good condition or else not be able to make sales. It is necessary therefore to provide a flexible packaging system which allows a bottler to ship containers of various diameters within the same packaging system without significantly increasing packaging costs. Increased packaging cost can occur due to assembling the individual cases, including assembling the boxes or cases with or without a separate divider. Further, the packaging system should efficiently use the space within each case or box, while allowing the flexibility of use with containers of differing diameters.

Returnable bottles, PET or glass, require cases with dividers to prevent the bottles from rubbing against one another during shipment and thereby being damaged. Nonreturnable bottles do not necessarily require these dividers because the amount of damage in just one trip would not be noticeable to the consumer.

SUMMARY OF THE INVENTION

Directed to remedying the problems of the past, a reusable case for storing, transporting and merchandising bottles of alternatively first and second different sizes or widths is herein provided. The case has opposing open first and second ends and a shelf secured therein and midway between the ends. First and second different divider structures are formed on opposite respective sides of the shelf. The first divider structure, with the first end oriented up, defines within the case and on the shelf a first plurality of pockets for retaining bottles of the first size. Alternatively and with the case flipped over, a second plurality of pockets for the second size bottles is formed on the other side of the shelf by the second divider structure. Bottles positioned in either of the pockets extend above the top of the case in an exposed merchandising position similar to that provided by the "Castle Crate" design of U.S. Pat. No. 4,899,874, whose entire contents are hereby incorporated by reference. When a similar case is stacked on top of the loaded case, the bottles extend up into the lower empty portion of the top case. The divider structures are configured so that the one facing down can receive up thereinto the tops of bottles in a case stacked therebeneath and in the pocket pattern of the different upwardly facing divider structure. The entire bottle case, and in isolation the wall construction, the entire divider assembly and the first and second divider wall structure also present novel and attractive designs or patterns.

DETAILED DESCRIPTION OF PREFERRED EMBODIMENTS OF THE INVENTION

Figure 1:
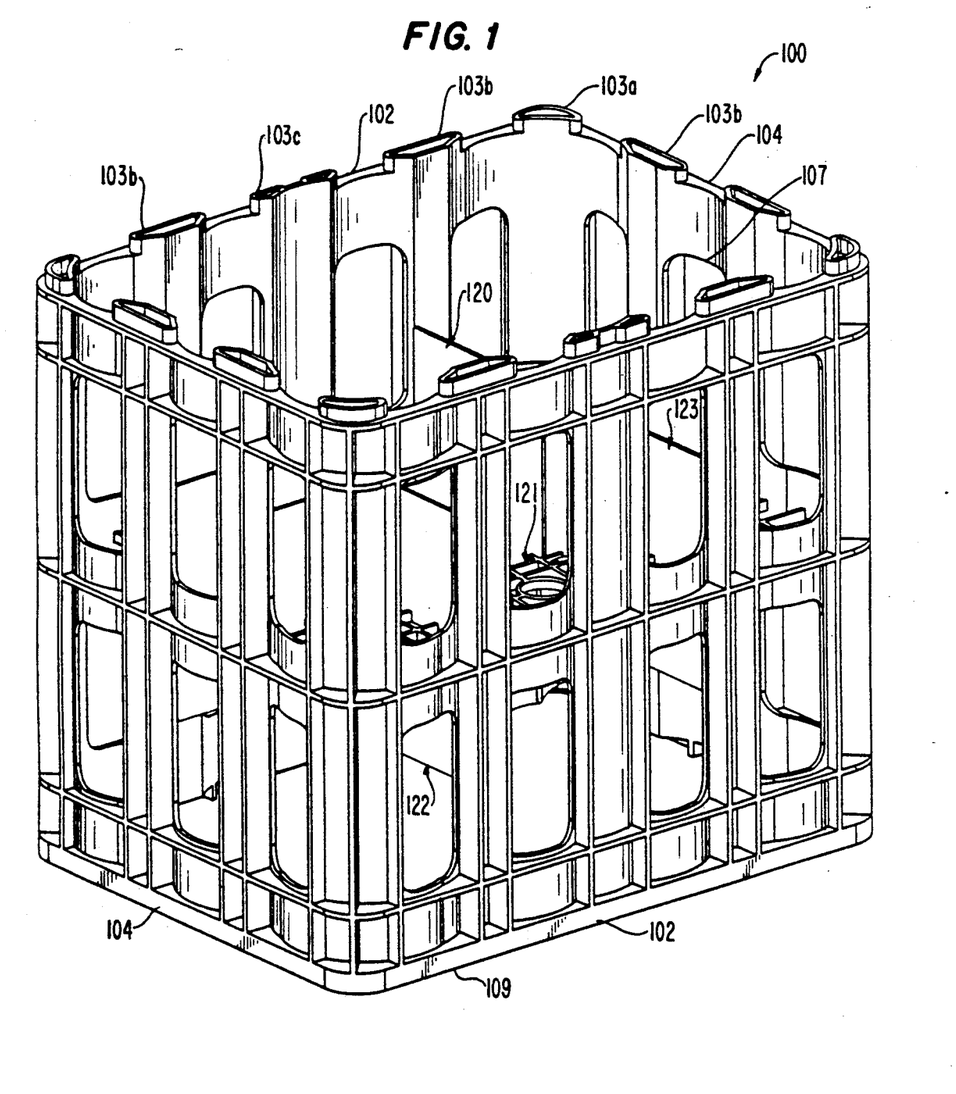
FIG. 1 is a top perspective view of a case of the present invention.
Figure 2:
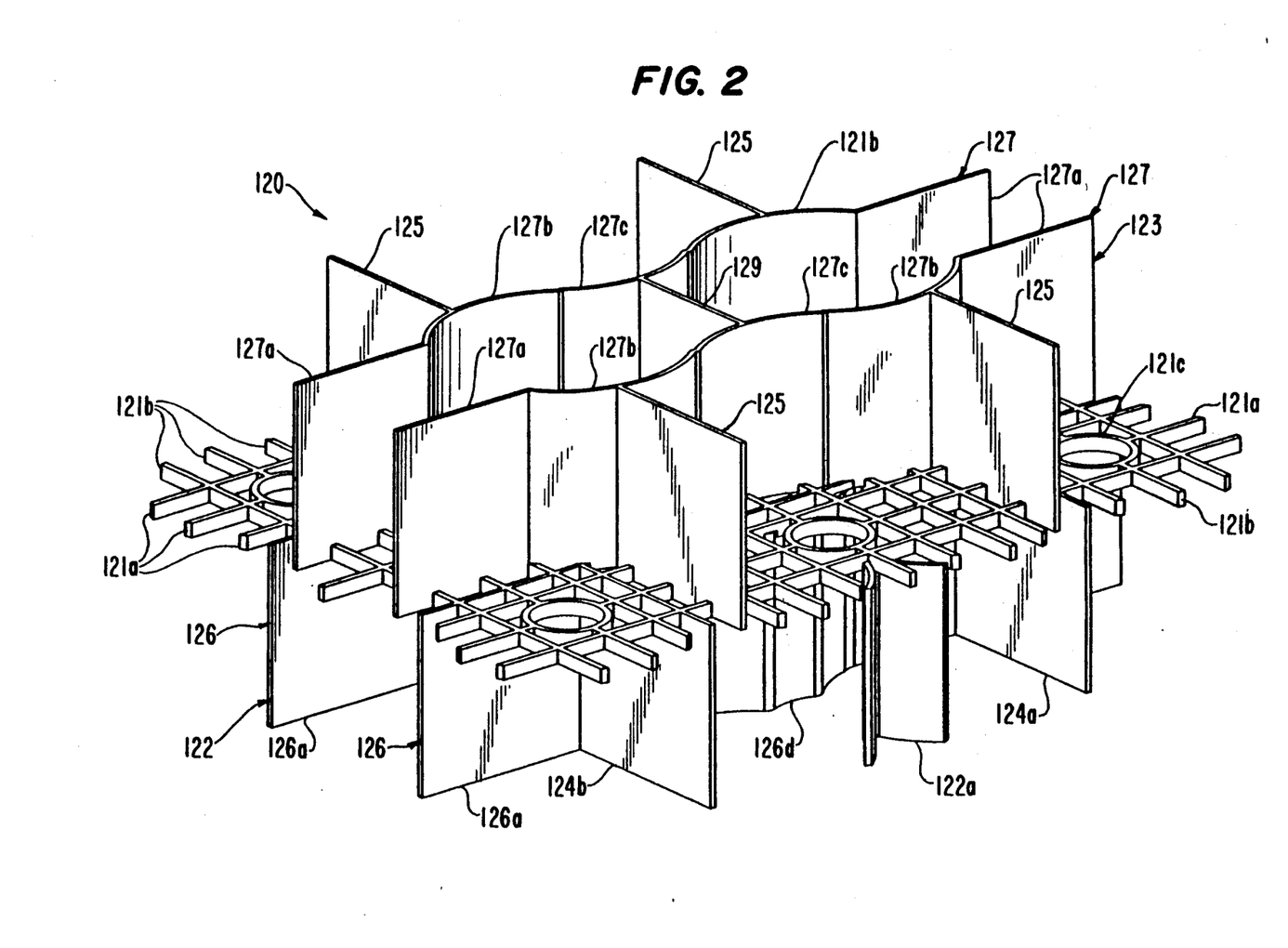
FIG. 2 is a top perspective view of a divider of the case in accordance with the present invention and illustrated in isolation.
Figure 3:
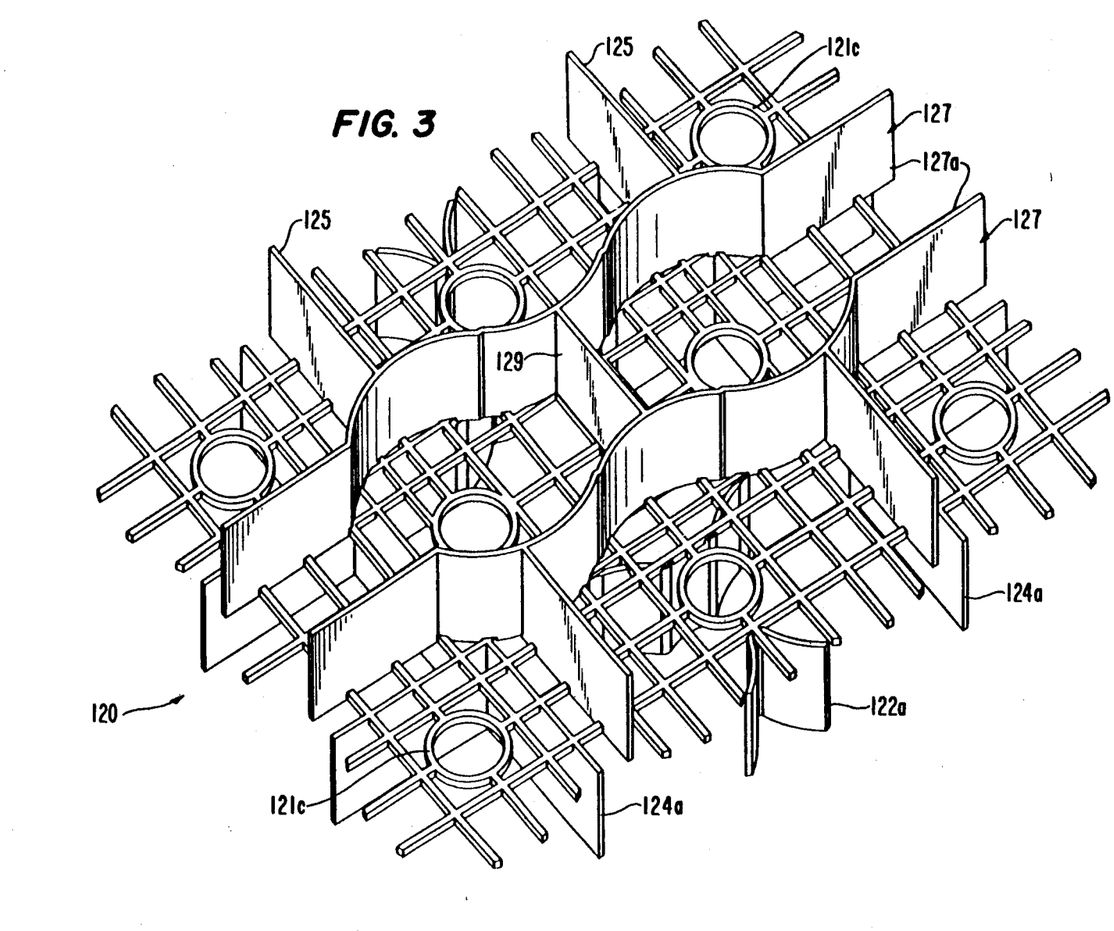
FIG. 3 is another top perspective view of the divider of FIG. 2.

Referring to the drawings, wherein like numerals indicate like elements, a case 100 in accordance with the present invention is disclosed. Case 100 is shown in FIG. 1 and includes four sidewalls, two of which are indicated as 102 and the other two of which are indicated as 104. Sidewalls 102 are of the same dimensions, and sidewalls 104 are of the same dimension; however, sidewalls 102 and sidewalls 104 may but need not have the same dimensions. Sidewalls 102 and 104 are molded of a plastic material such as high density polyethylene. Sidewalls 102 and 104 can be formed of other plastic materials or materials different than plastics, as would be apparent to those skilled in the art.

Case 100 is formed with an open top 107, an open bottom 109, and a support member 120 positioned in the middle between them. Support member 120 comprises a shelf member 121, an upper divider member 123 and a lower divider member 122. Shelf member 121 is formed of a series of bars 121a and 121b in an open gridwork design to provide drainage through the case 100 and a lighter and less expensive construction. Bars 121a, 121b are formed of the same plastic material as that of the sidewalls 102, 104. Shelf member 121 is preferably molded integrally with the sidewalls but can also be attached to the sidewalls after the sidewalls 102, 104 have been formed. Circular members 121c are provided in the shelf member 121, one for example at each fluid containing support area on the shelf member. Other designs of the shelf member 121 as would be apparent to those skilled in the art are also within the scope of this invention.

Although upper divider member 123 is shown in the present embodiment as forming eight container pockets, it is possible to have an upper divider configuration which provides a greater or lesser number of container pockets depending upon the particular overall size of the case and the number and type of containers to be shipped. Lower divider member 122 is designed to preferably have a different number of container pockets such as twelve as is illustrated; however, the number of container pockets in the lower divider member can also be varied. The number of container pockets for any particular divider member is determined by the size of the containers to be shipped in the carton and the variations between diameters of the containers.

In the specific construction of the shelf member 121, upper divider member 123 includes connecting wall 129, outer walls 125 and longitudinal walls 127. Longitudinal walls 127 are formed by straight wall portions 127a, outwardly curved wall portions 127b and inwardly curved wall portions 127c. Each longitudinal wall 127 is formed with a single inwardly curved wall portion 127c which is connected to the connecting wall 129. At either side of inwardly curved wall portions 127c are the outwardly curved wall portions 127b, and connected to the other end of outwardly curved wall portions 127b are straight wall portions 127a. The cooperation between curved wall portions 127b and 127c and connecting wall 129 defines two central container pockets. Outer walls 125 and straight wall portions 127a combine to define the corner container pockets. The outer walls 125 and the curved wall portions 127b, 127c in turn cooperate to define the two middle container pockets.

Figure 4:
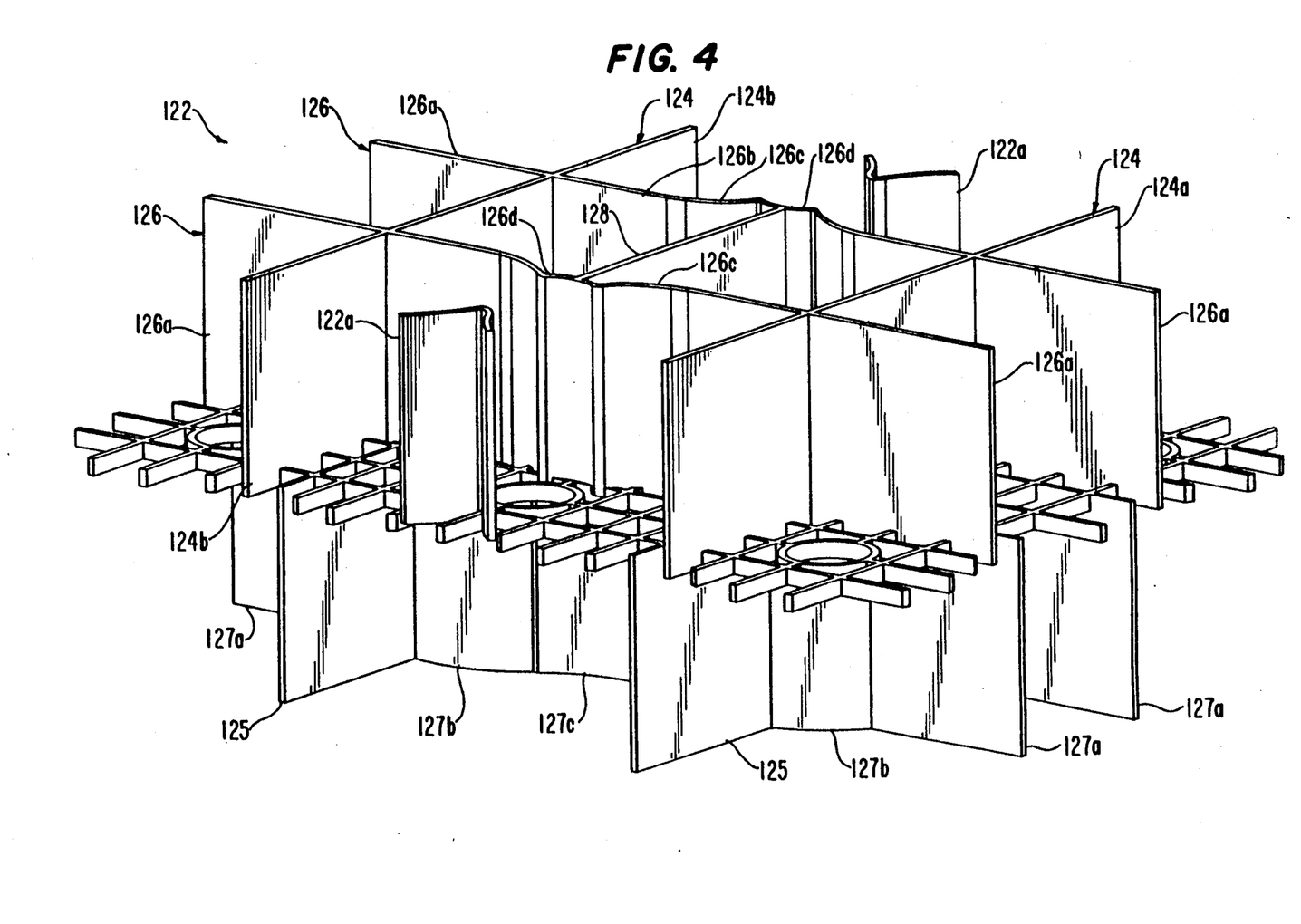
FIG. 4 is a bottom perspective view of the divider of FIG. 2.
Figure 5:
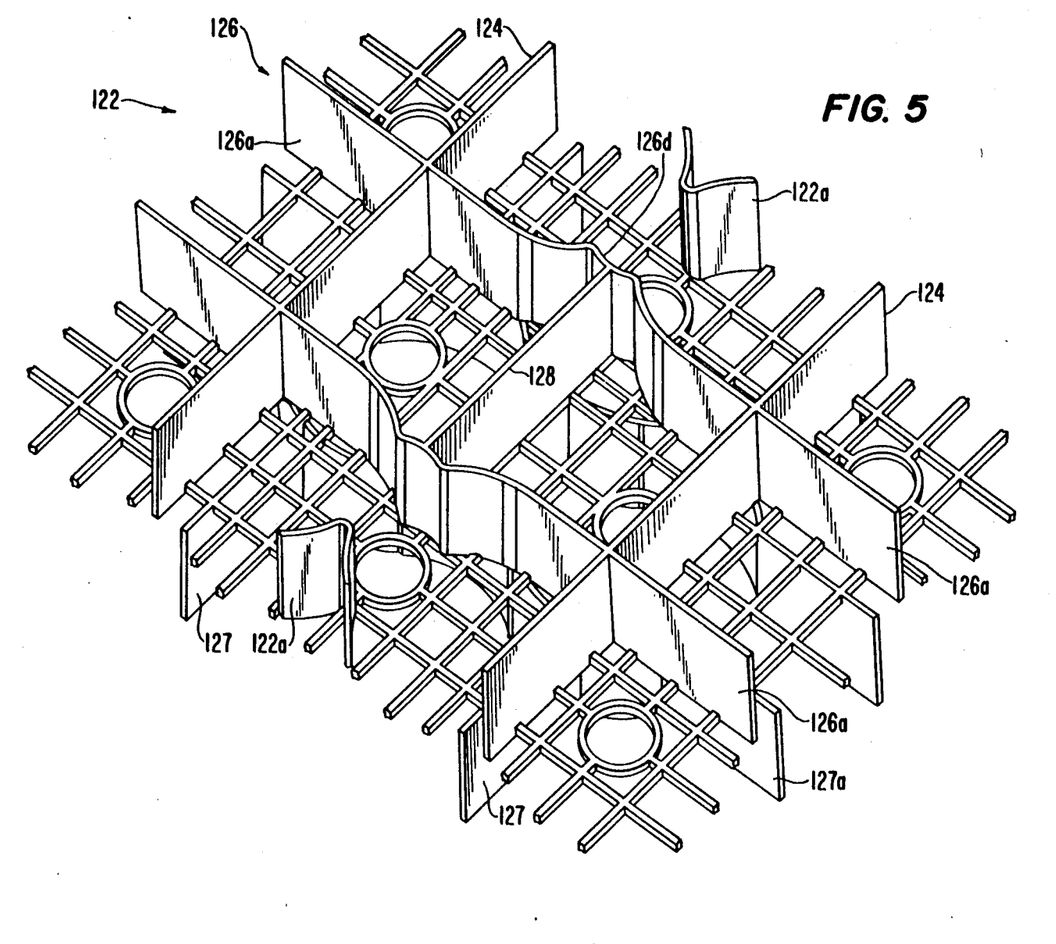
FIG. 5 is another bottom perspective view of the divider of FIG. 2.

Referring to FIGS. 4 and 5, lower divider member 122 is formed having short wall portions 124 positioned on either end of the lower divider member. A pair of longitudinal walls 126 intersect short wall portions 124 at two points each, to thus divide short wall portions 124 into three equal sections. Longitudinal walls 126 are formed with two transition wall sections 126c positioned between short wall portions 124. Transition wall sections 126c are joined to curved wall portions 126d. Curved wall portions 126d in turn are joined together by a connecting wall 128. Positioned a distance spaced away from each curved wall portion 126d and between short wall end portions 124a, 124b is a side member 122a. Side members 122a divide the space between short wall end portions 124a, 124b and the longitudinal walls 126 into two container pockets. Thus, lower divider member 122 is designed to provide container pockets for twelve containers.

Figure 6:
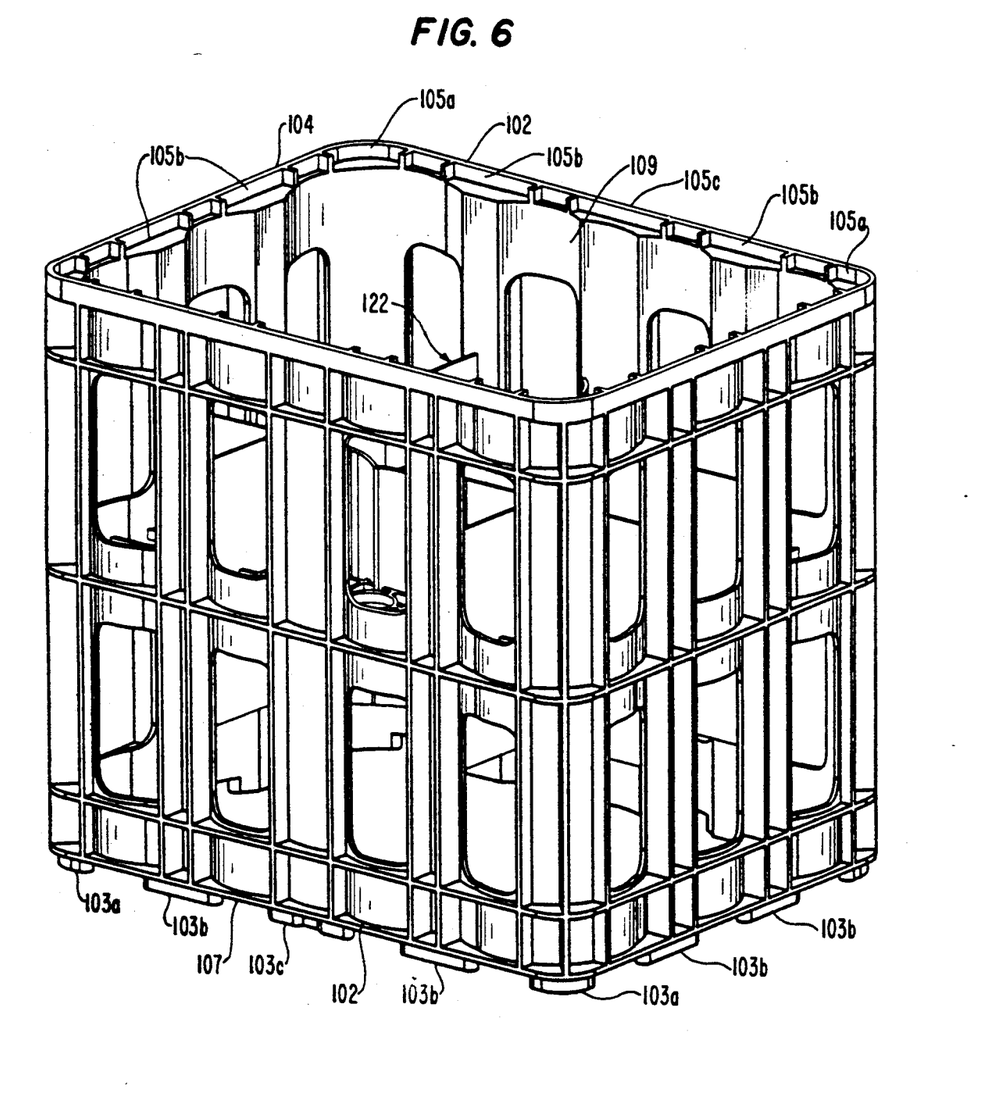
FIG. 6 is a bottom perspective view of the case of FIG. 1.
Figure 7:
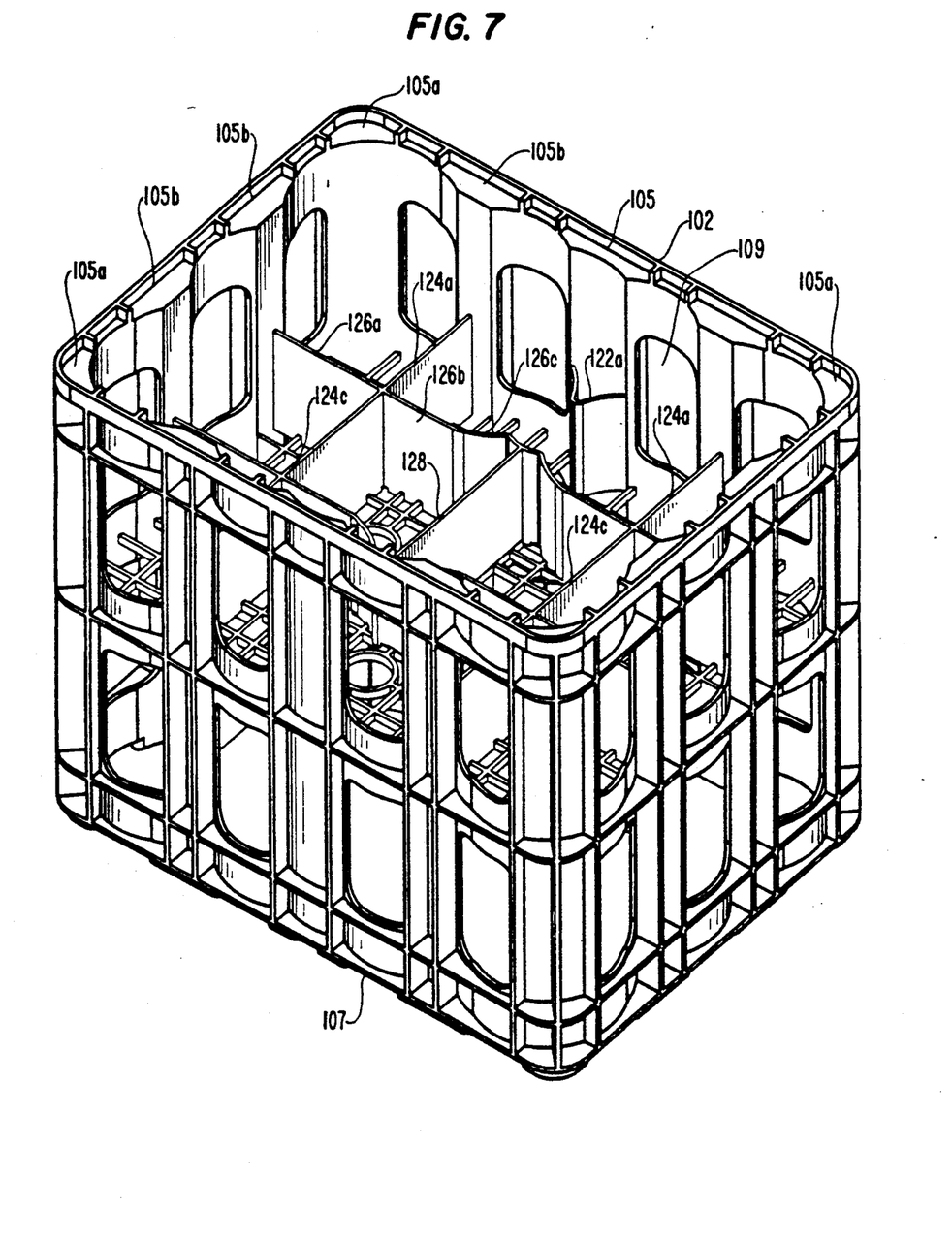
FIG. 7 is another bottom perspective view of the case of FIG. 1 showing the divider in greater detail.
Figure 8:
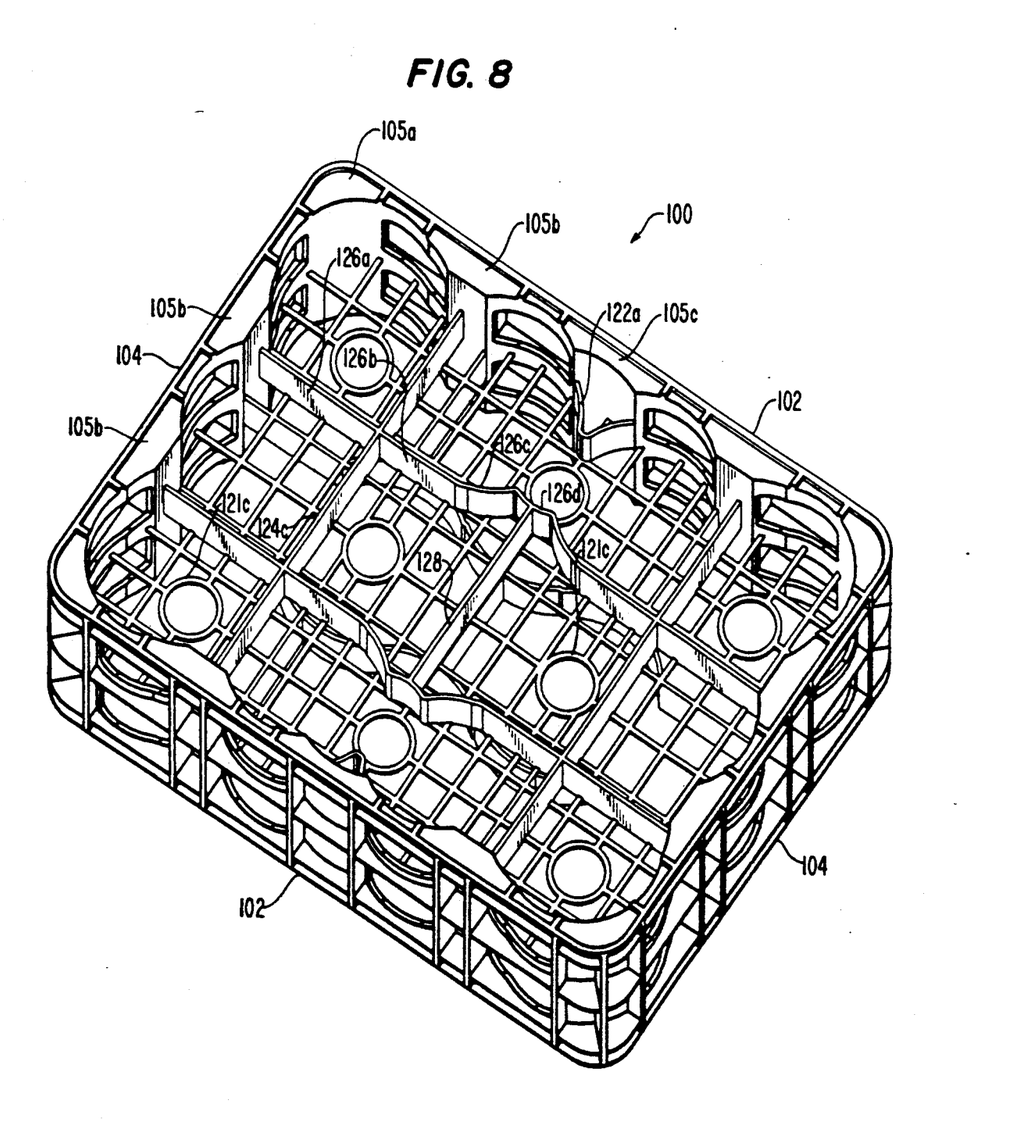
FIG. 8 is a further bottom perspective view of the case of FIG. 1.

Referring to FIGS. 1 and 6, case 100 is formed with a series of locking members extending outwardly from the top edges of each wall member and inwardly from the lower edge of each wall member. Outwardly extending male locking portions 103a–103c are formed at the upper open end 107 of case 100. A number of corresponding female member openings or sockets 105a–105c are formed in the lower open end 109 of carton 100. Locking members 103a and female socket 105a are formed as curved portions that extend around the corners of each case to thus lock the corners together when the cases are positioned one on top of the other. The other locking portions 103b and 103c and 105b and 105c may be of the same dimensions, but it may be necessary to form them of different corresponding dimensions and cross-sections depending upon the strength requirements of the case. Both the upper and lower locking surfaces of the case thereby form drag rails having large drag surfaces as are needed with today's rough handling of cases.

The present case functions to store, transport and merchandise containers of different diameters by having two different alternative sets of integrally formed dividers attached thereto. Each divider is formed with a fixed number of container pockets formed by the walls of a divider member, such that a fixed number of containers of a set diameter can be placed within the dividers. The containers when placed within the dividers and the case 100 extend upwardly from the outer edges 107 or 109, respectively. The case thus formed, functions like a conventional half-depth case, wherein the containers extend outwardly from the upper top of the case into a merchandising position wherein their labels are visible and they are easily accessible to the consumer.

When it is desired to store or transport the cases, one case can be stacked directly upon another (half) case. Previously when loaded half-depth cases were stacked one upon the other the containers had themselves to bear the compressive loads, which can result in container and/or closure failure and loss of product. In contrast, in the present invention the shape of the walls of the divider members are such that when the cases are stacked one upon another, the containers within the lower case extend outwardly or upwardly from the open top surface of the case and into the open bottom surface or compartment of the upper case. Because of the carefully designed curvature of the walls of the divider members the upper cap portions of the containers can pass between the spaces created, thus containers of differing diameters can be stored in the upper divider member and the upper portions of containers can pass through spaces created in the lower divider member when they are stacked and vice versa. Thus, as is apparent, each case rests upon a lower case without transmitting any support loads to the bottles. The lower edges of the walls 102, 104 engage and the locking portions 103a–103c engage the locking female portions 105a–105c to lock the cases together.

The inside walls of the crate and the divider walls are shaped to confine the (returnable) bottles in their respective pockets or cells and to prevent them from impacting or rubbing against each other during transport and handling. The inside walls (and the divider walls as previously discussed) are configured to conform to the sides of generally cylindrical bottles of a first diameter in a first pattern and bottles of a second different diameter and in a second different pattern. Thus, a unique configuration or "scalloping" of the inside walls is needed. For example, each of the four corners, when looking down (or up) on it, is defined by three connected curves—the outer two of which are identical and the middle one of which has a longer radius of curvature. The centerlines of each of the arcs are the centerlines of the bottles fitting in the pockets.

Figure 9A:
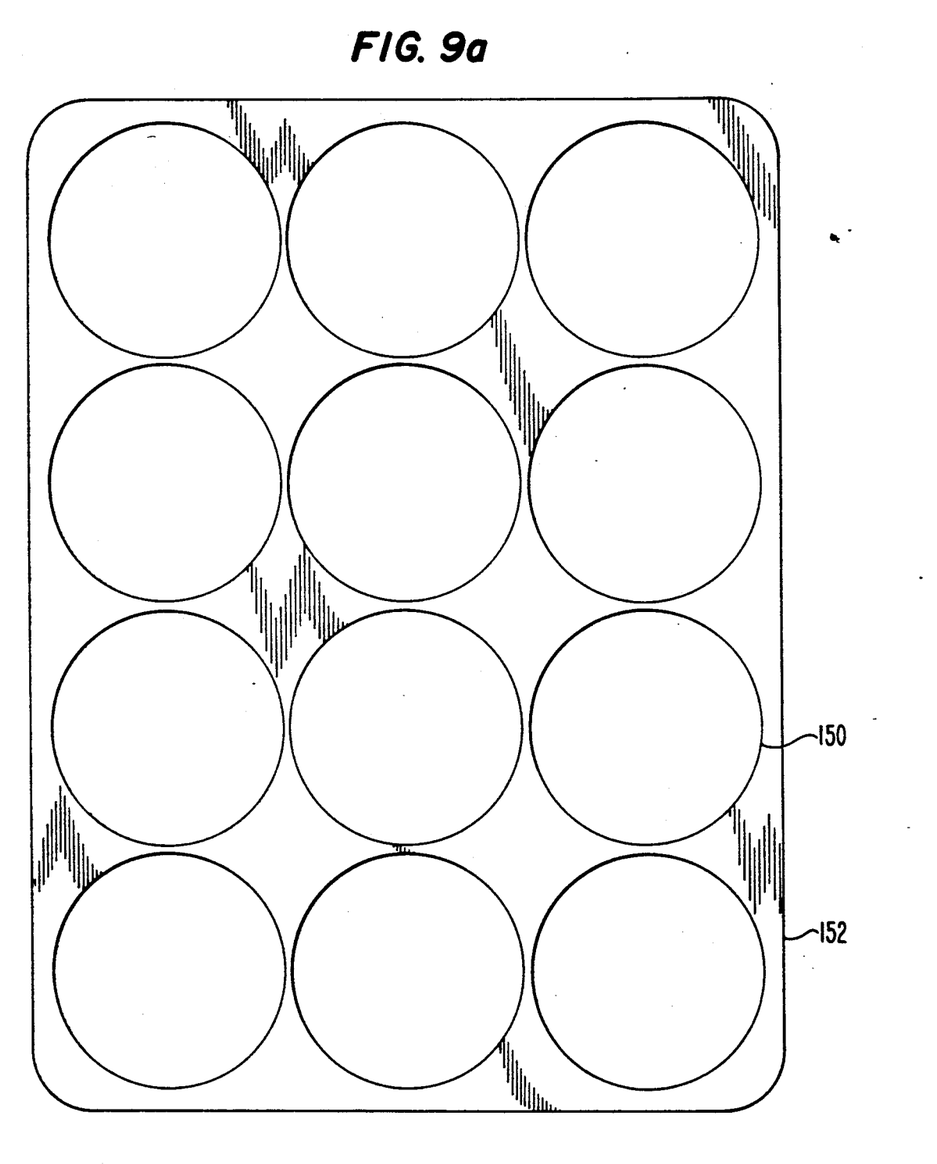
FIGS. 9a-9e illustrate with top schematic views a procedure for designing the configuration of the inner walls of the case of FIG. 1.
Figure 9B:
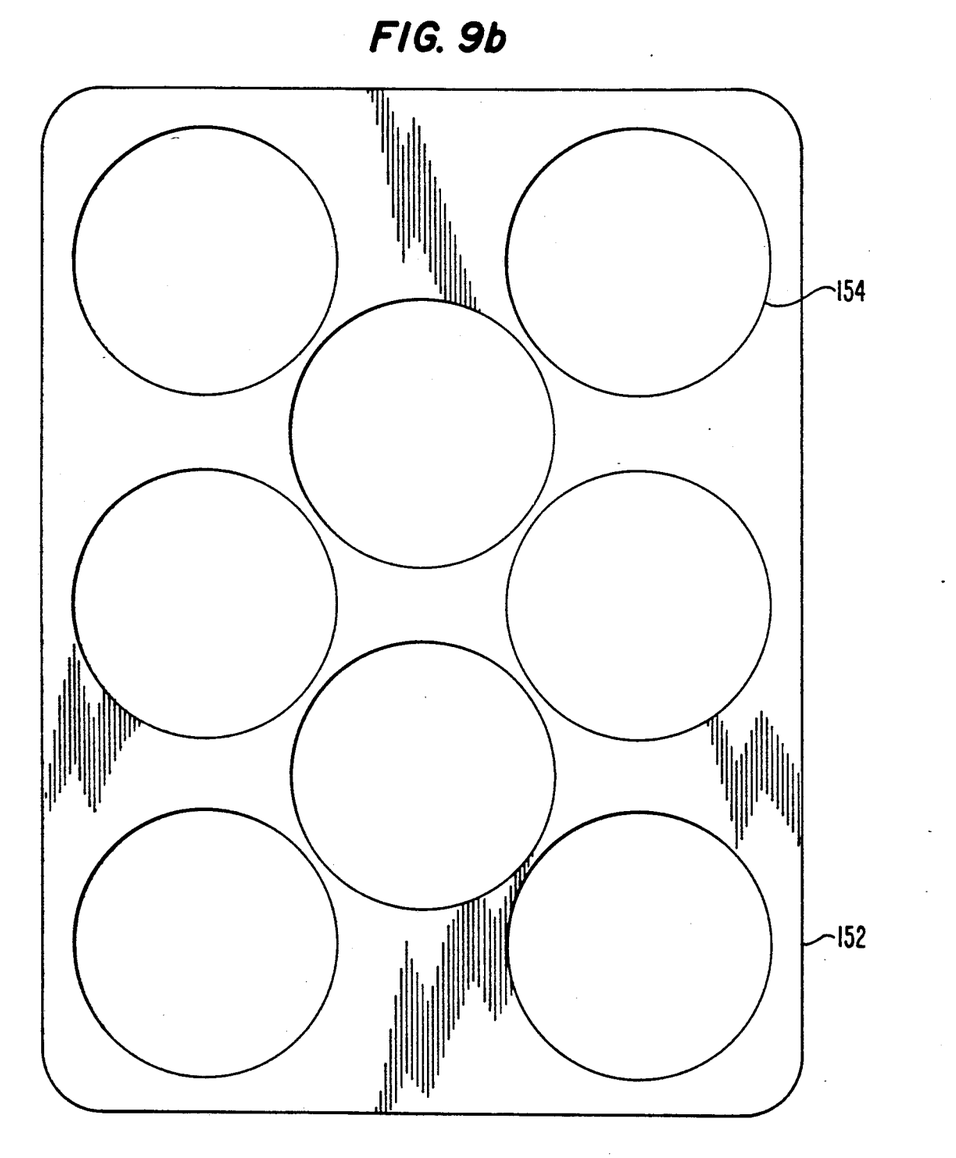
Figure 9C:
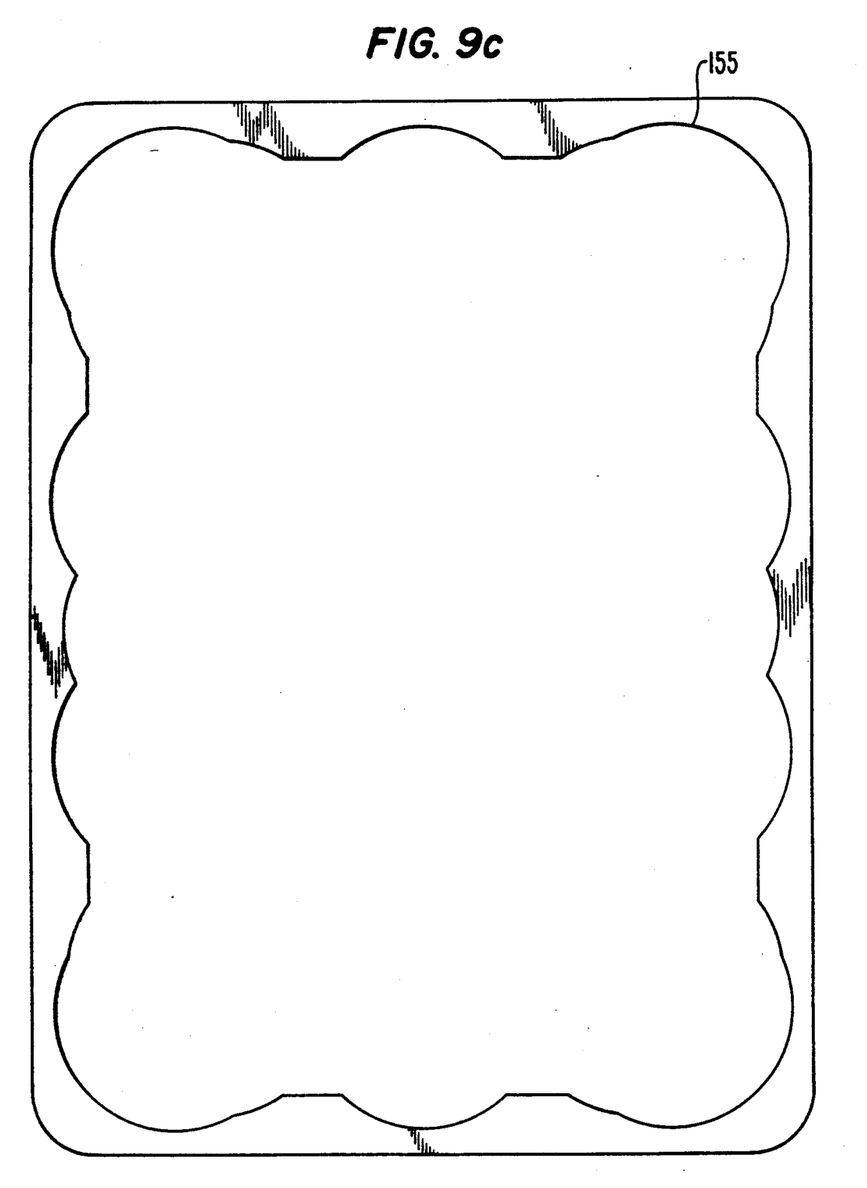
Figure 9D:
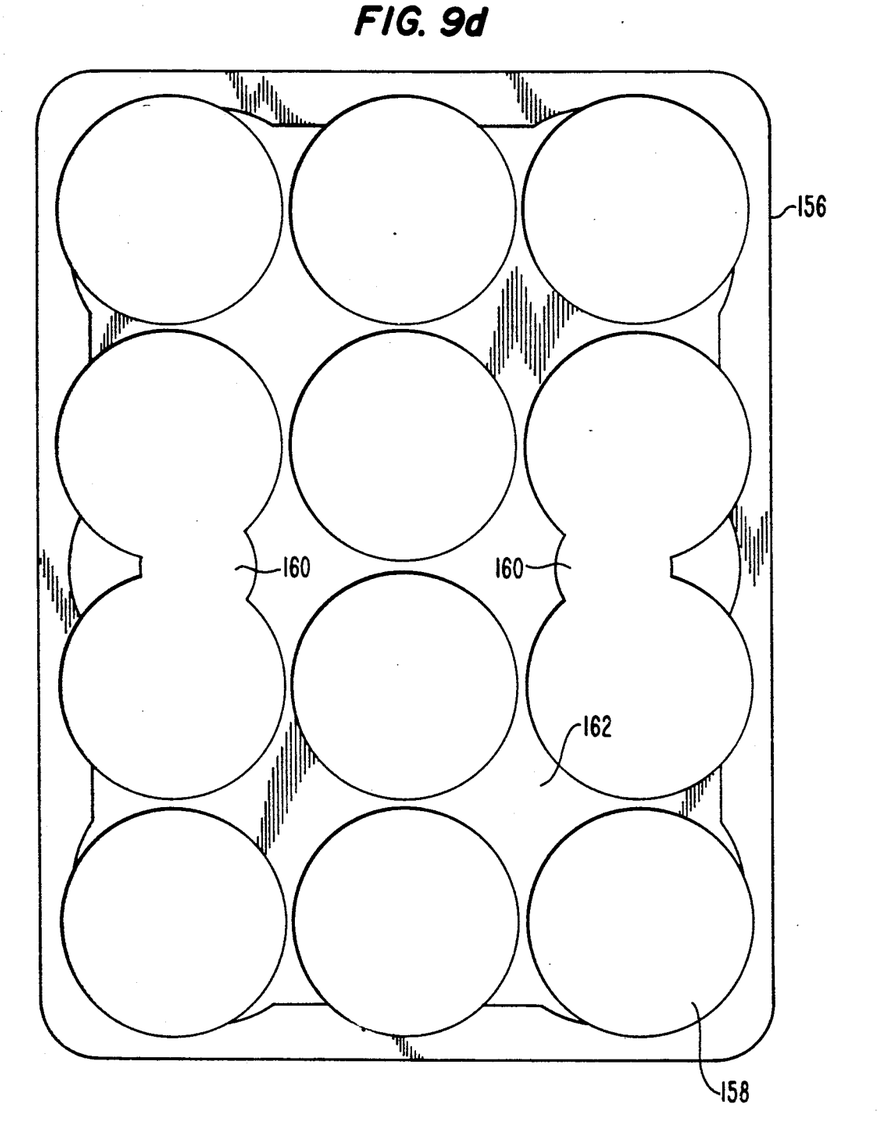
Figure 9E:
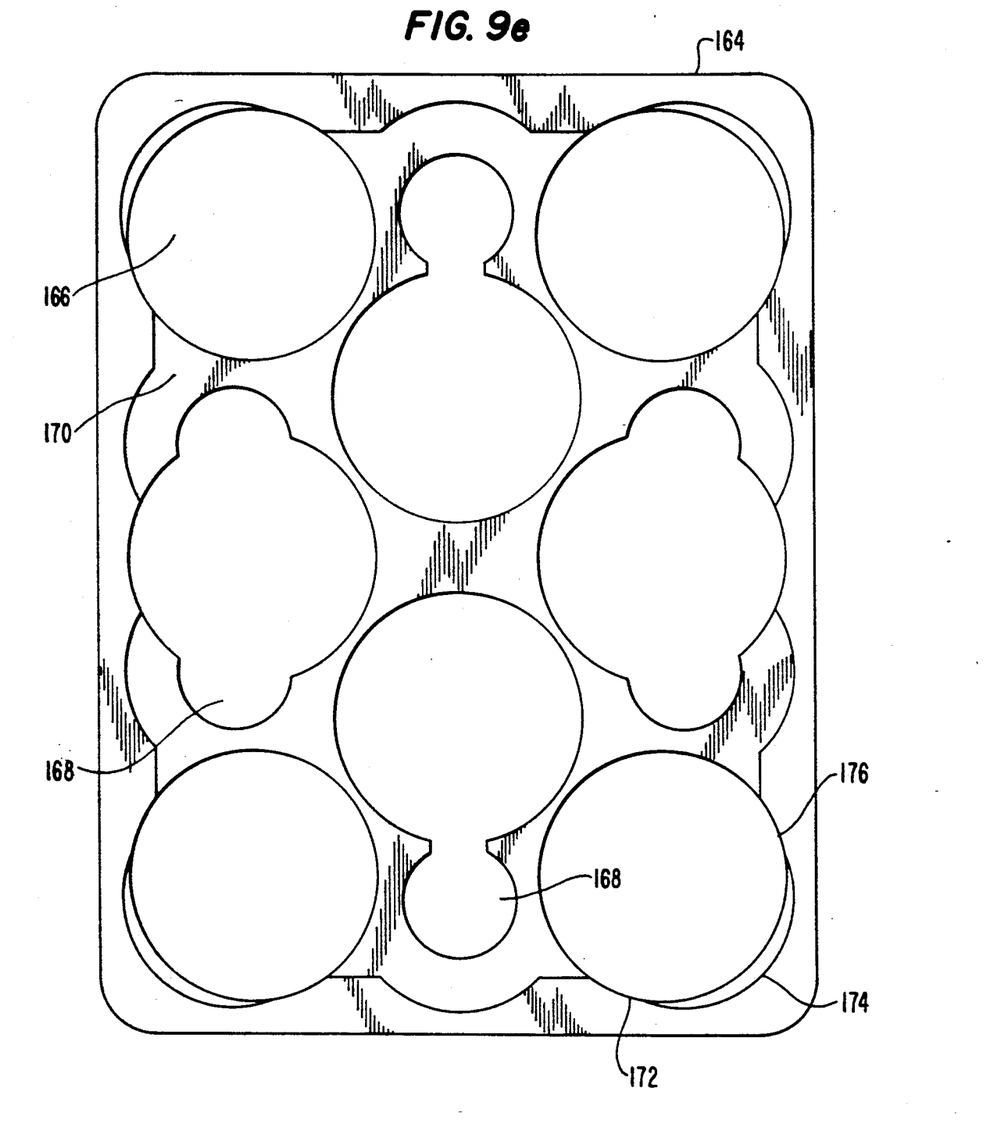

A procedure for configuring the inner walls will now be described with reference to FIGS. 9a-9e for a twelve bottle-eight bottle case. FIG. 9a shows twelve bottles or bottle locations shown schematically at 150 located within a rounded corner rectangle 152, and FIG. 9b shows eight larger bottles 154 within the same rectangle. FIG. 9c shows the "scallop" wall configuration 155 from combining the outer bottle configurations of FIGS. 9a and 9b. FIG. 9d shows a twelve pack configuration for one-and-a-half liter PET or one-and-a-quarter liter glass bottles. The side wall is shown therein by reference numeral 156, the location of the bottles by 158, the clearance areas for the "eight bottle" tops by 160, and the area available for the separating means by 162. FIG. 9e shows an eight pack configuration for two liter PET or one-and-a-half liter glass bottles. The side wall is shown therein by reference numeral 164, the larger bottle locations by 166, the clearance areas for the "twelve bottle" tops by 168, and the area available for the separating means by 170. Each inside wall corner is thereby defined by three arcs 172, 174 and 176 wherein arcs 172 and 176 have the same curvature and length. Possible configurations for the divider walls can thereby be determined from FIGS. 9d and 9e.

Returnable bottles are often, especially in Europe, shipped in full-depth cases. The thinking is that you do not want to repeatedly stress the bottles, especially PET bottles, and their caps by stacking half-depth cases one on top of the other. Conventional full-depth cases, however, when loaded, can usually be stacked only two pallets high, each pallet being five cases high. If stacked higher, the cases often fail as all of the loads above them bear down on the long unsupported case walls. In contrast, the present case design allows the loaded cases to be stacked significantly higher. This is because the divider assemblies divide the outer case walls at their middles and thereby advantageously divide the length of the unsupported wall heights in half. Further, the divider walls are molded to the case walls and extend up a distance on the case walls and themselves thereby transmit some of the loads and significantly increase the load-bearing strength of the cases. Less plastic in the walls and thereby in the overall cases is thereby needed. The cases can thereby be made lighter, cheaper, easier and quicker.

As an example, the case wall is preferably fourteen inches high (plus three-quarter inch drag rails at the top and bottom ends thereof), the shelf divides the wall(s) in half and the divider walls extend three inches above and below the shelf. This leaves only four inches of unsupported walls from above and below the ends of the divider walls to the drag rails. The three-inch high dividers are also not so tall as to be difficult to manufacture. Tall dividers are difficult to manufacture because of the greater draft per side required for pulling them away to free themselves from the metal mold.

The divider structures can be configured as spaced cones, instead of long walls, to thereby form the pockets and thereby separate the bottles. In this regard, U.S. application Ser. No. 531,471 filed this same day and entitled "Packaging Case for Variable Diameter Bottles" is relevant and is hereby incorporated by reference in its entirety. The cones would not transmit compressive load forces on the case, however, and thus construction of the dividers as upright walls secured to and formed with the case, as illustrated in the drawings, is the preferred construction.

In the present invention, it was desired for the case to handle four different types of returnable containers, namely, (1) one and a quarter liter glass and (2) one and a half liter PET, and (3) one liter glass and (4) two liter PET. The containers fall into these two groups of diameters (1 and 2) and (3 and 4) that are roughly equivalent. These diameters allowed for a twelve pack and an eight pack configuration in a given convenient case dimension, as can be understood from FIGS. 9a-9e. If it is desired to ship a particular container of a particular diameter, all the manufacturer need do is to position the case to the appropriate diametered container pockets for the containers. The present invention is thus designed such that it can be used in an automated packaging system (not shown). A series of limit switches or photo cells, for example, can determine what position the case is in whenever a particular diameter container is being used. The automated packaging system automatically positions the case such that it is oriented with the appropriately dimensioned pockets ready to accept the corresponding containers. In one contemplated system, if a case is determined to be in the wrong orientation a conveyor forming a spiral along a horizontal path is used to cause the case to be turned over and then returned back to the original conveyor line.

The invention has been described above with particularity in regards to the detailed description of the invention. However, the disclosure is illustrative only and the invention is not limited to the precise illustrated embodiment. Various changes and modifications can be made by one of ordinary skill in the art without departing from the scope or spirit of the invention.

What is claimed is:

1. A container case comprising:
   a wall structure having an open first end and an open second end disposed opposite to said open first end, said wall structure being positionable in a first orientation wherein said open first end is upwardly disposed and in an alternative second orientation wherein said open second end is upwardly disposed;
   a floor assembly secured in a generally central location between said open first and second ends and in and to said wall structure;
   first divider means for securely retaining therein, in separate first pockets thereby formed and with said wall structure in the first orientation, a first plurality of first fluid containers, each first pocket having a first lower pocket diameter, on said floor assembly and in a low depth arrangement relative to said box wall structure, said first divider means being disposed generally between said floor assembly and said open first end and supported by said wall structure; and
   second divider means for securely retaining therein, in separate second pockets thereby formed and with said wall structure in the second orientation, a second plurality of second fluid containers, each second pocket having a second lower pocket diameter different from the first lower pocket diameter, on said floor assembly and in a low depth arrangement relative to said box wall structure, said second divider means being disposed generally between said floor assembly and said open second end and supported by said wall structure.

2. The container case as recited in claim 1 further comprising drag rails formed around each of said open first and second ends, one of said drag rails being formed with male locking portions and the other of said drag rails being formed with female locking portions with said male locking portions on a first said container case being adapted to engage female locking portions on a second said container case to prevent relative lateral movement.

3. The container case as recited in claim 1 wherein said first and second divider means are both made from a plurality of wall portions which are of a height which is less than the height of containers placed within the container case such as to prevent the first containers when positioned in said first pockets from impacting or rubbing and prevent the second containers when positioned in said second pockets from impacting or rubbing.

4. The container case as recited in claim 3 wherein said case is a half depth case and at least some of said wall portions of said first and second divider means are curved such that the upper half of the first containers can fit within said second pockets and the upper half of the second containers can fit within said first pockets.

5. The container case as recited in claim 1 wherein said wall structure is fourteen inches high, and said floor assembly is positioned equidistant from both open ends, said first and second divider means extending three inches in height from said floor assembly toward each respective open end.

6. The container case as recited in claim 1 wherein said container case, said floor assembly and said first and second divider means are formed integrally from a molded plastic material.

7. The container case as recited in claim 1 wherein said first divider means is designed to have eight first pockets for receiving eight containers all having a first diameter which corresponds to the first lower pocket diameter and said second divider means is designed to have twelve second pockets for receiving twelve containers all having a second diameter which corresponds to the second lower pocket diameter.

* * * * *